Dec. 22, 1942.  K. C. THORNELOE  2,306,091

BASKET FOR CENTRIFUGAL SEPARATING MACHINES

Filed Aug. 23, 1940

Inventor
Keith C. Thorneloe

By
Attorney

Patented Dec. 22, 1942

2,306,091

UNITED STATES PATENT OFFICE 2,306,091

BASKET FOR CENTRIFUGAL SEPARATING MACHINES

Keith Cartledge Thorneloe, Wilton Woods, near Alexandria, Va.

Application August 23, 1940, Serial No. 353,969

3 Claims. (Cl. 210—76)

The present invention relates to improvements in baskets employed in centrifugal separators which have a perforated circumferential wall against the inner surface of which is placed a filter lining.

In the present practice, these filter linings, which ordinarily comprise a lamination of wire gauze or mesh, have been held in place at their edges by a metal expanding ring or some such like means which would permit the linings to be readily removed for cleaning or replacement.

Experience has taught, however, that with such means now employed there is a great waste or leakage of the material, being centrifuged, because this material will seep around the top and bottom edges of the filter lining and not be subject to the centrifuging action desired of passing through the filter lining. Particularly where good or 100% separation is desired, this seepage destroys the results desired.

It is the object of the present invention to overcome the above stated drawback and to provide a very simple and economical means which will seal the edges of the filter lining against such seeping of the material, being centrifuged, around the filter edges while at the same time permit the ready removal of the filter linings for such purposes as may be desired.

Figure 1:
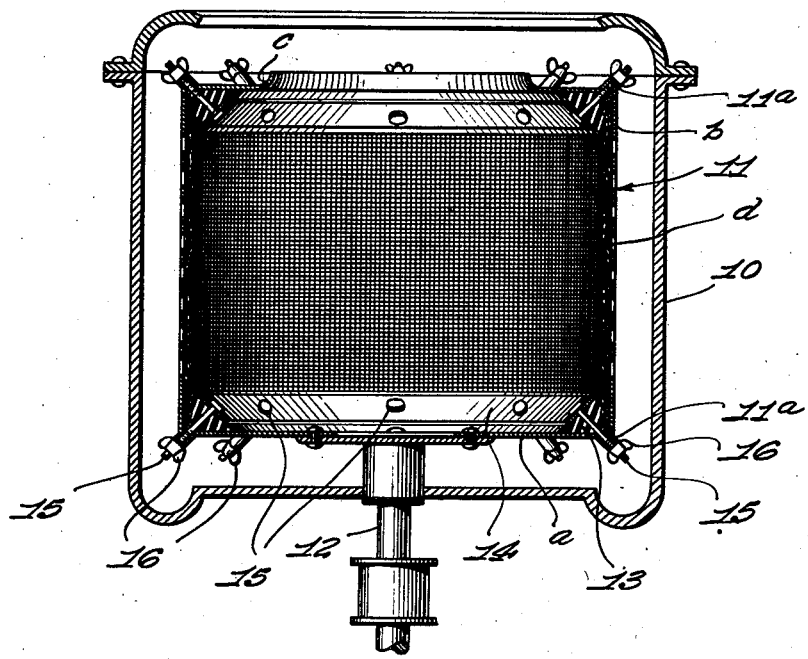
Figure 2:
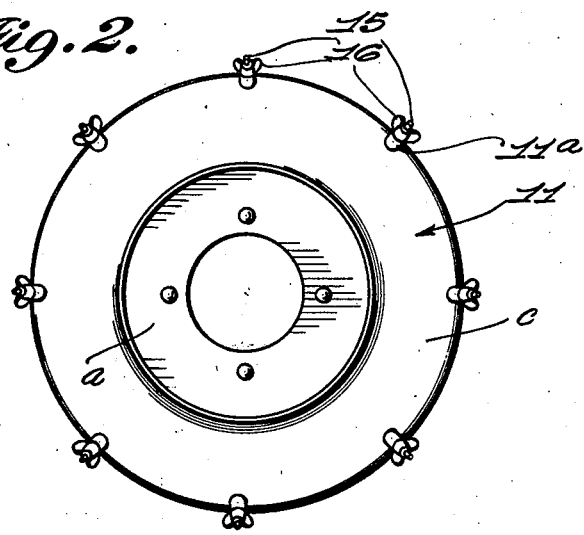
Figure 2:

In the accompanying drawing, the preferred construction of the present invention, as at present devised, is illustrated and in which:

Figure 1 is a vertical section of a centrifugal basket equipped with the present invention; and Figure 2 is a plan view of the basket, only, as shown in Figure 1.

Throughout the specification and drawing, like characters of reference refer to similar and like parts, and wherein 10 denotes the casing of an ordinary or conventional centrifugal machine having a rotary basket 11 arranged in the casing and fixed on a central shaft 12 journaled in the bottom of the casing. Of course, it is understood that any approved means may be employed for supporting and rotating the basket in the casing and that the present drawing is only illustrative of one of such means.

The basket 11 may be of any suitable construction having a bottom $a$, a cylindrical foraminated side wall $b$, an annular top wall $c$, and an inner cylindrical filter $d$, usually of wire-gauze or of desired mesh, arranged within the basket against the inner surface of the side wall $c$ and extending to or adjacent the top and bottom edges of the side wall $c$.

The present invention comprises the provision of a relatively soft and compressible gasket 13, in combination with the basket 11 and the filter $d$, and is preferably triangular in cross-section, and disposed in a corner of the basket at the juncture of either its bottom wall $a$ or its top wall $c$, or both, with its side wall $b$ and of such size or dimension as will lap the adjacent edge of the filter $d$ and as will extend around the entire edge or edges of the filters, as shown in Figure 1. The gasket 13 may be made of rubber or any other like or suitable material that will function in the manner herein described.

The gasket or gaskets 13 are held tightly and firmly in place by a ring 14 of rigid material, such as metal, fibre or the like, disposed on the exposed surface of the gaskets and by bolts 15 passing at spaced intervals through openings in the ring 14, the gasket 13, and the corner 11$a$, of the basket 11. The bolts 15 have nuts 16 on the ends thereof exteriorly of the basket for tightening and holding the gasket in place and for permitting its easy removal.

It will be observed that two faces of the gasket, which are substantially at right angles with respect to each other, are arranged to engage respectively the walls of the basket at the juncture or corner of the side wall $b$ with either the bottom wall $a$ or top wall $c$; and that the bolt openings in the gasket extend from its other or third surface through the point of juncture of said right-angle surfaces at which point the basket is reinforced due to said angular surfaces. Thus, when the nuts 16 are screwed up tightly, the gasket will bear against at least two angular surfaces of the basket with a sealing pressure, due to its yieldable character, which will prevent the material being treated from passing around the edges of the filter instead of through it.

It is, of course, understood the gaskets extend around the interior circumference of the basket and at both edges of the filter $d$, as shown, and that in some instances the ring 14 may be illuminated if the bolts 15 are positioned sufficiently close together and washers are used under their heads. Also, the bolts may be integral with the ring 14 or the gasket may have one end of the bolts embedded and vulcanized in it.

Having thus described the present preferred embodiments of the invention and the manner in which it is to be performed, it is to be understood that the invention may be varied or modified within the scope of the appended claims.

That which is claimed as new is:

1. The combination with a centrifugal basket having top, bottom and side walls and a filter lining the inner surface of said side wall, of a gasket disposed in said basket circumferentially of said side wall at the juncture of said side with one of said other walls of the basket, said gasket being substantially triangular in cross section with two of its side faces contacting respectively the surfaces of said walls of the basket at their juncture and one of said two side faces of the gasket overlapping the adjacent edge of said filter lining, rigid means substantially continuous about the third face of said gasket for compressing the same against the said opposing surfaces of said basket and the lapped edge portion of said filter to produce a sealed contact between said parts, and holding means for removably maintaining the gasket in position and for applying a compression force against said rigid compression means.

2. In a centrifugal basket as set forth in claim 1 wherein said compression means and said removable holding means comprises, respectively, a relatively rigid compression ring on the third face of the gasket, and bolts extending through the ring, gasket and basket, and nuts on the free ends of the bolts.

3. In a centrifugal basket as set forth in claim 1 wherein said removable holding means includes spaced headed bolts extending through said compression means and said gasket and projecting therefrom at the juncture of said first two mentioned angular surfaces thereof and extending through openings in said basket, and nuts on the free ends of said bolts.

KEITH C. THORNELOE.